(No Model.) 5 Sheets—Sheet 2.

M. J. OWENS & H. J. COLBURN.
GLASS BLOWING MACHINE.

No. 576,074. Patented Jan. 26, 1897.

Fig. 3ª

Witnesses:
J. D. Garfield
K. I. Clemons

Inventors:
Henry J. Colburn.
Michael J. Owens
by [signature]
Attorneys.

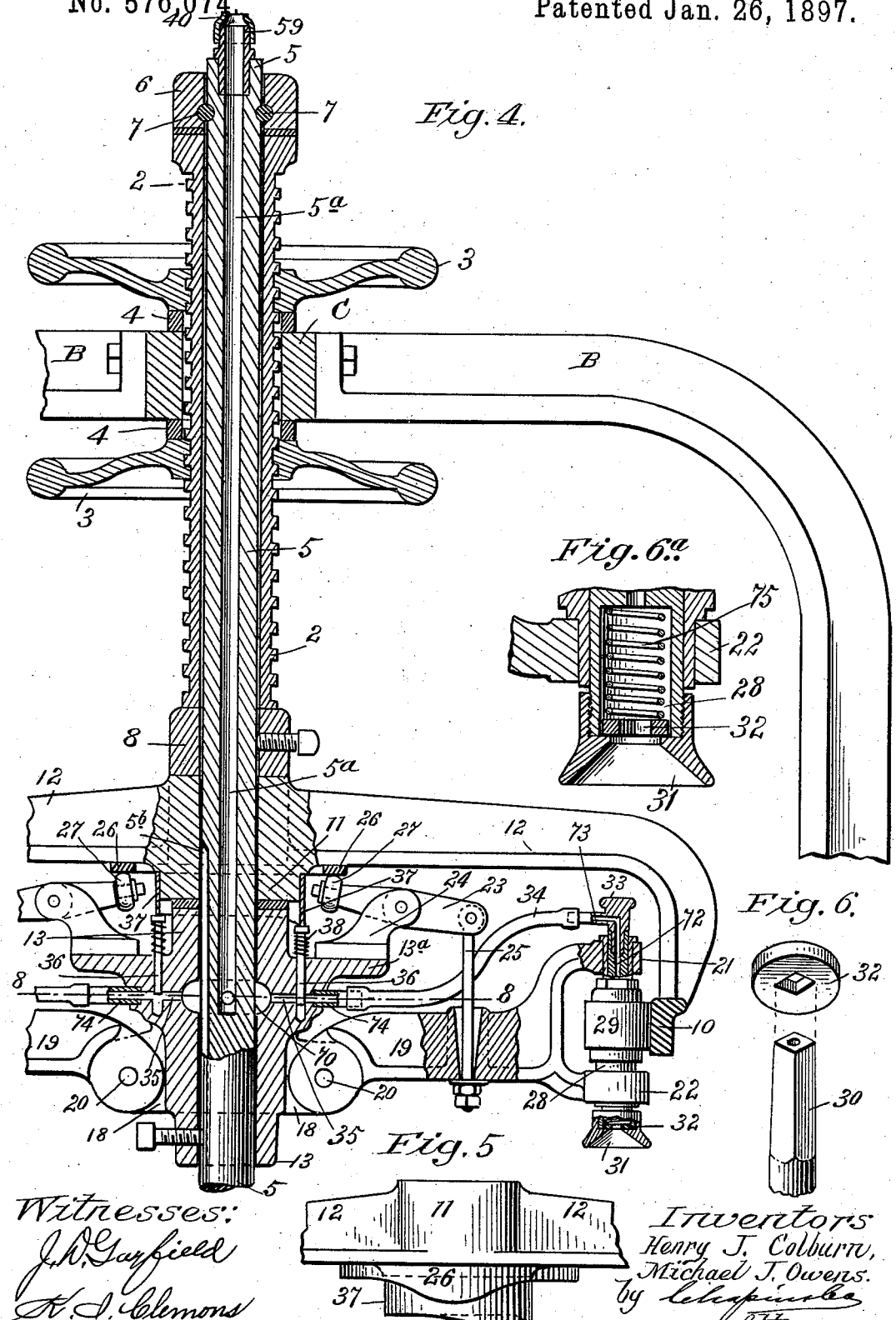

(No Model.) 5 Sheets—Sheet 4.

M. J. OWENS & H. J. COLBURN.
GLASS BLOWING MACHINE.

No. 576,074. Patented Jan. 26, 1897.

Witnesses:
J. D. Garfield
H. J. Clemons

Inventors,
Henry J. Colburn,
Michael J. Owens,
by Chapin & Co.
Attorneys.

THE NORRIS PETERS CO., PHOTO-LITHO., WASHINGTON, D. C.

(No Model.)  5 Sheets—Sheet 5.

M. J. OWENS & H. J. COLBURN.
GLASS BLOWING MACHINE.

No. 576,074. Patented Jan. 26, 1897.

Witnesses:
J. D. Garfield
K. J. Clemons

Inventors:
Henry J. Colburn
Michael J. Owens.
by Chapin & Co
Attorneys.

UNITED STATES PATENT OFFICE.

MICHAEL J. OWENS AND HENRY J. COLBURN, OF TOLEDO, OHIO, ASSIGNORS TO THE TOLEDO GLASS COMPANY, OF SAME PLACE.

GLASS-BLOWING MACHINE.

SPECIFICATION forming part of Letters Patent No. 576,074, dated January 26, 1897.

Application filed April 24, 1896. Serial No. 588,855. (No model.)

*To all whom it may concern:*

Be it known that we, MICHAEL J. OWENS and HENRY J. COLBURN, citizens of the United States of America, residing at Toledo, in the county of Lucas and State of Ohio, have invented new and useful Improvements in Glass-Blowing Machines, of which the following is a specification.

This invention relates to glass-blowing machines, and more particularly to automatic machines of that class, and is in the nature of an improvement on the glass-blowing machine on which a patent was granted to Michael J. Owens October 22, 1895, and numbered 548,588.

Our invention consists, essentially, in the air-controlling mechanism whereby the degree of pressure given to the blow-irons is applied as desired, and improved means for supporting and adjusting the blow-irons and their connections, and certain improved constructions pertaining to the sectional mold, all as hereinafter described and claimed.

Figure 1:
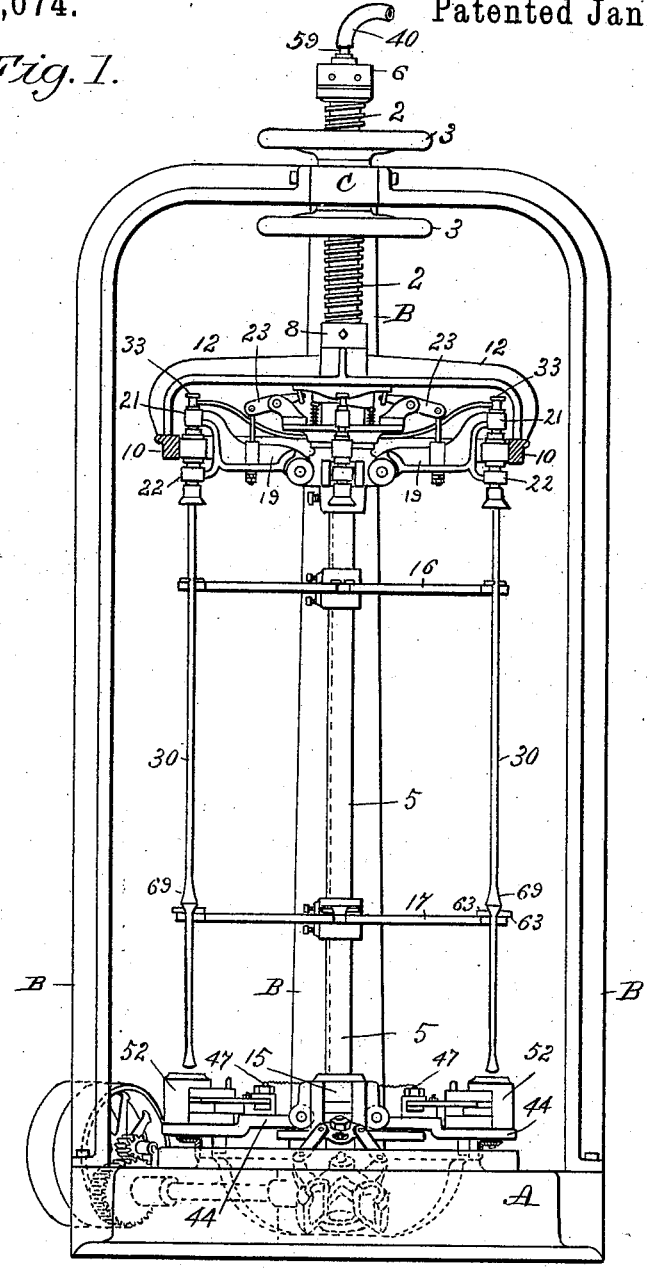
Figure 2:
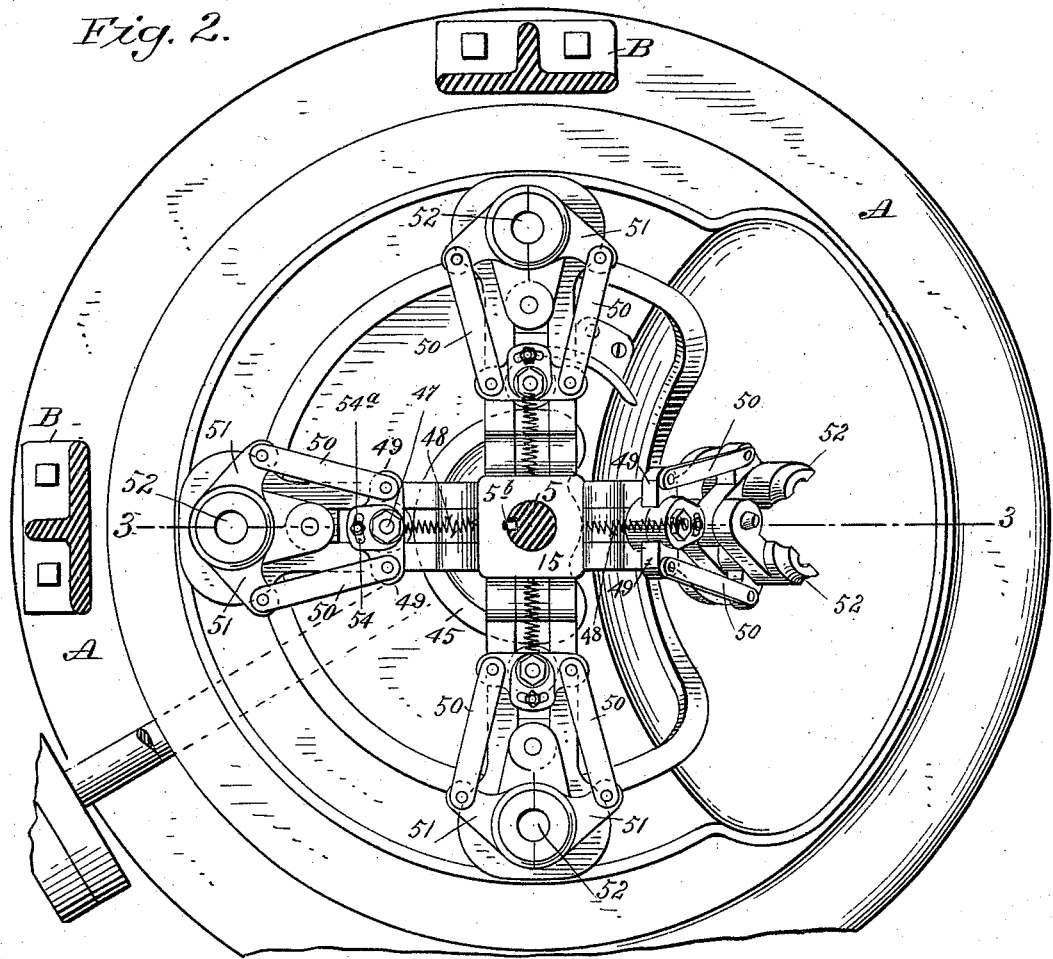
Figure 3:
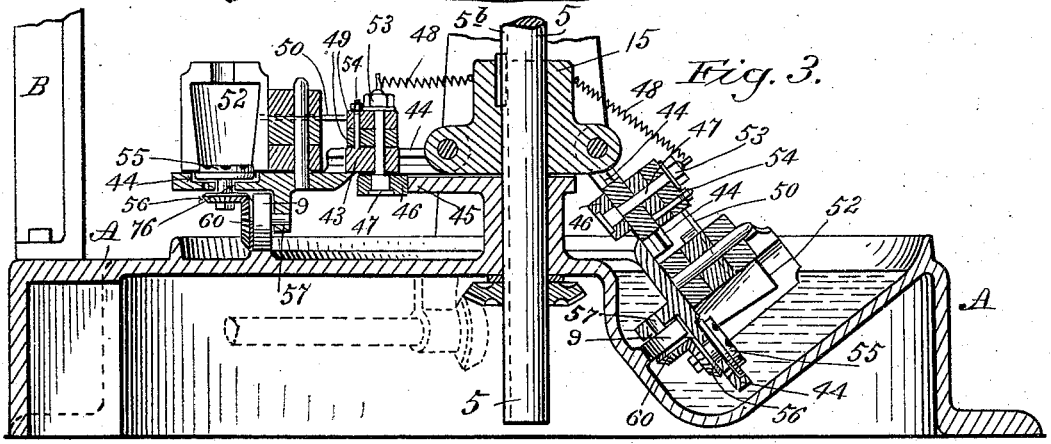
Figure 7:
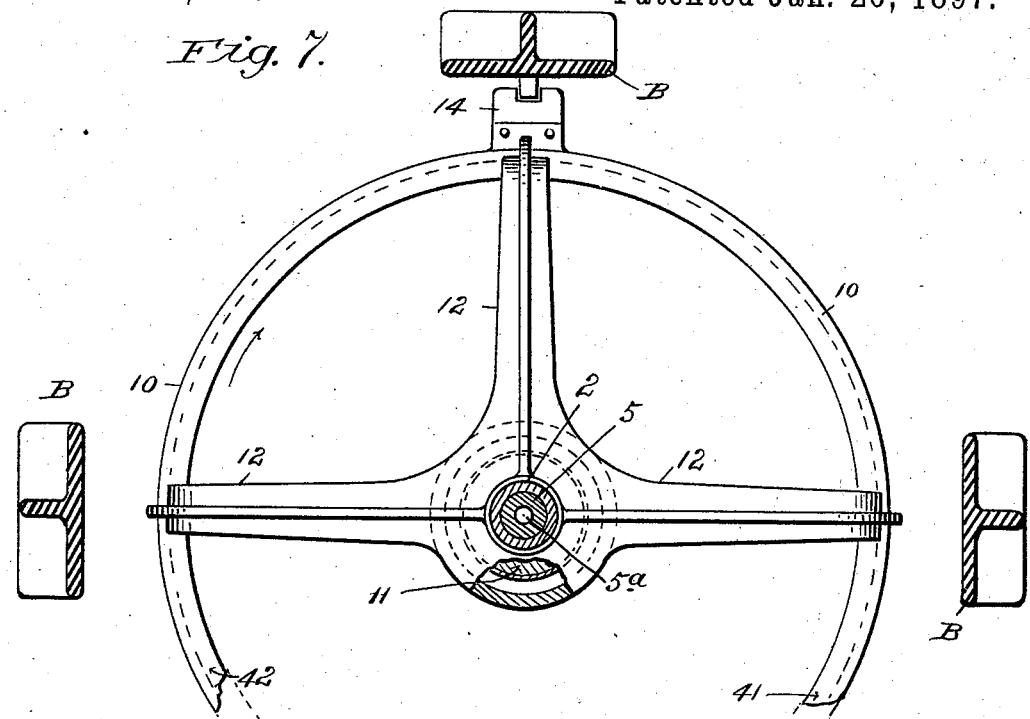
Figure 8:
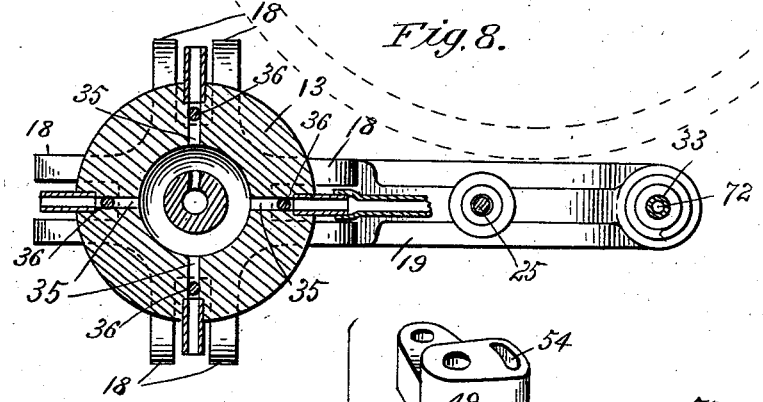
Figure 10:
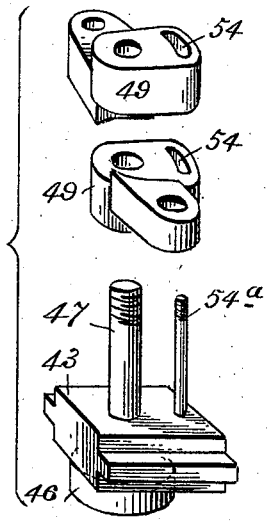
Figure 9:
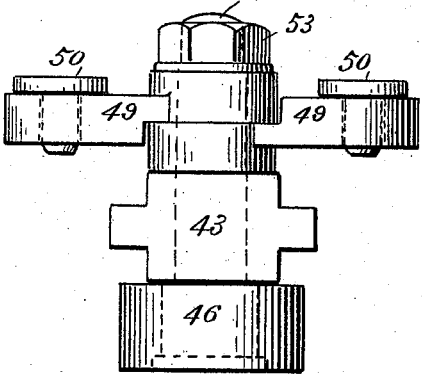
Figure 11:
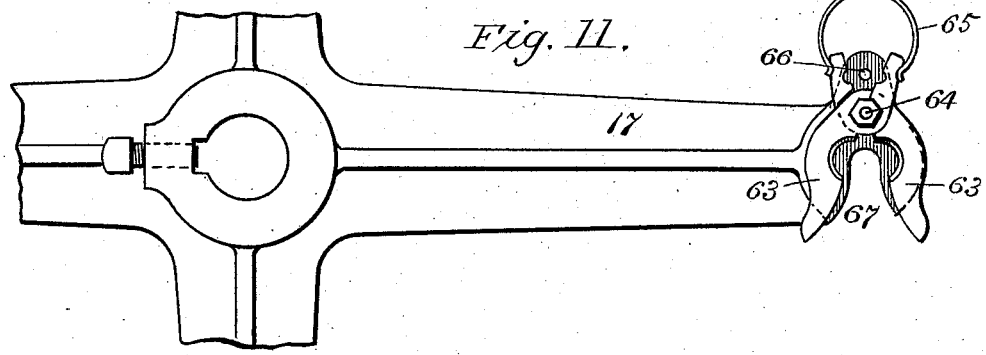
Figure 12:
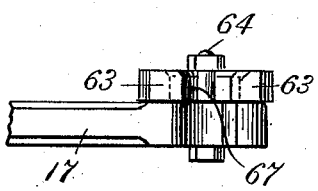
Figure 13:
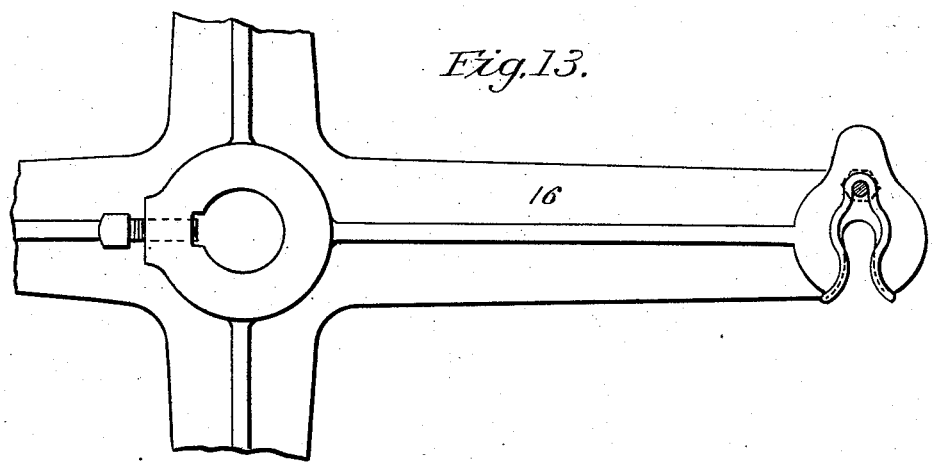

Referring to the drawings forming part of this specification, Figure 1 is an elevation of a glass-blowing machine constructed according to our invention. Fig. 2 is an enlarged plan view of the base of the machine, showing the central shaft and portions of the frame in section. Fig. 3 is a vertical section through Fig. 2 on line 3 3. Fig. 3ª is a plan view of the rotating bottom of the sectional mold. Fig. 4 is an elevation, still further enlarged, of the upper extremity of the machine, partly in section. Fig. 5 is an elevation of two cams shown only in section in Fig. 4. Fig. 6 is a view of the upper end of one of the blow-irons and its receiving-socket. Fig. 6ª is a detail view of portions of Fig. 4 and is hereinafter described. Fig. 7 is a plan view, on the same scale as Fig. 2, of the friction-ring and its arms and having a portion of its hub broken away, showing in section the position of two cams secured on the hub thereof and means for holding said friction-ring against rotation. Fig. 8 is a sectional view taken on line 8 8. Fig. 4. Fig. 9 is an end view of a portion of the mold-opening mechanism. Fig. 10 is a view in perspective of the main parts of Fig. 9. Fig. 11 is a plan view of the latch on one of the arms of the lower of the two spiders carried on the central shaft of the machine. Fig. 12 is a side view of said latch. Fig. 13 is a plan view of a spring-clip on the upper one of the said two spiders.

In these various figures like letters and numerals of reference refer to like parts.

On a suitable base A are secured by bolts the three posts or arms B, whose upper ends converge to a central hub C, to which arms B are bolted. Said base A and arms B are preferably made of cast-iron. Said central hub C is provided with a vertical aperture therein in line perpendicular with the center of base A, through which passes the screw-threaded sleeve 2. Said sleeve 2 is supported by the two hand-wheels 3 3, whose hubs are threaded to engage the same, one on each side of the said hub C, and whereby the said sleeve may be moved vertically and locked in any desired position. Between the hubs of said hand-wheels and the upper and under faces of said hub C are two vulcanite or other washers 4 4. Within said sleeve 2 is located the rotatable shaft 5, which is the main shaft of the machine and extends from the collar 6, above the end of said sleeve, to and into the base A. The upper end of said shaft projects above the end of said sleeve a short distance, and said collar 6 is secured thereto by any suitable means. In this case two pins 7 7 are shown as passed through said collar and the opposite sides of the shaft, securing the collar thereon. Between said collar and the top of sleeve 2 is a vulcanite or other suitable antifrictional washer. A second collar 8 is secured on said shaft 5 by a screw-bolt or other suitable means at the lower extremity of said sleeve 2. Thus we have a vertically-movable sleeve hung centrally in the top of the frame of the machine, within which is the shaft 5, rotatably supported therein by a collar or other suitable means on the top of said sleeve. This shaft 5 actuates the various parts of the machine, as below described. An annular friction-ring 10, (see Fig. 7,) having the arms 12 and a central hub 11, fits loosely and is supported on said shaft 5 between the collar 8 and the main hub 13 of the shaft 5, said hub 13 being secured rigidly thereto by a bolt or other suitable means. Said annular friction-ring 10 is held against rotation on said shaft by a short slotted arm 14, fixed thereto and engaging a rib on one of the vertical arms B of the machine. (See Fig. 7.)

From the upper extremity of shaft 5 to a point about opposite the center of the hub 13 said shaft is provided with a central air-passage $5^a$, suitable outlets from said air-passage to an annular cavity 70 in said hub 13 being provided and air-passages 35 from said cavity to the exterior of said hub, a more detailed description of which will be given farther on.

The shaft 5 is provided with a spline-groove $5^b$, extending from a point just under said collar 8 to its lower extremity, the hubs 13 and 15 being provided with suitable keys engaging said groove, whereby said two hubs are rotated coincidingly by the said shaft. Said hub 15 (see Fig. 3) is the one to which the sectional molds 52 are connected and which are rotated in a circular path on the base A of the machine by said shaft 5, and at proper times are opened, immersed in water, and closed automatically, substantially as described in said Owens patent above referred to. Between said hubs 13 and 15 are located the spiders 16 and 17, (see Fig. 1,) consisting of suitable hubs having radial arms thereon, one terminating over each mold of the machine. These spiders are for supporting the blow-irons 30 in operative relation to the molds and to the conduits above said blow-irons, as shown in Fig. 1, and at the extremities of said arms are provided means for holding said blow-irons, which will be fully described farther on. The hubs of said spiders are also provided with suitable keys engaging said spline-groove in the shaft 5, whereby they are engaged to be turned by said shaft. Set-screws in the hubs of said spiders, as shown in Figs. 11 and 13, permit them to be adjusted to any desired position on the shaft. Any suitable means for driving said shaft 5 may be adopted. A bevel-gear connection, as shown herein, is preferably employed. As aforesaid, said main hub 13 is fixed to the shaft 5 and supports the friction-ring 10 and its arms and hub on its upper end, an antifrictional washer of vulcanite or other material being interposed between the two bearing-surfaces, as shown.

Cast on the main hub 13 are the four pairs of short arms 18, (see Fig. 8,) each pair receiving the vertically-swinging arm 19, which is secured between said arms 18 by a pin or bolt 20. Each of said arms 19 is provided on its outer end with a yoke consisting of the two arms 21 and 22 and with means for imparting to said arms 19 a vertically-swinging motion at certain periods in their rotation, which means consist of a lever 23, pivotally supported by the arms 24, secured to said hub 13 above and in a line vertically with the center of the arms 19. From the outer end of said lever 23 depends a rod 25, pivotally connected to said lever by one end and by its opposite end engaging, as shown, with said arm 19. The inner end of said lever 23 extends back toward the hub of said friction-ring 10, to which hub is secured an annular surface cam 26, having a downwardly-curved portion $x$, as shown in Fig. 5. A roll 27 on the said inner end of said lever 23 bears on said surface cam and is held in contact therewith by the weight of said arm 19. Said surface cam 26, being secured to the hub of said ring 10, does not rotate, but said revolving main hub 13 carries the arms 19 and their operating mechanism around within said fixed ring 10, the rolls 27 bearing on the face of said cam and the variations of the surface level operating to impart a vibratory motion to said arms 19 at the proper time during the said rotation of the parts carried by said hub 13, causing each arm 19 to be lifted up at the required time and to resume its position in operative relation with the upper end of the blow-iron by gravity. A revoluble shaft 28, having fixed thereon a pulley or friction-surface 29, preferably covered with leather, is supported in suitable bearings in said arms 21 and 22. Said friction-pulley has a suitable intermittent bearing against the inner side of said fixed ring 10, whereby it is given an intermittent rotary motion, and thereby causes the blow-iron 30, which may be in engagement therewith, to have like rotary movement. The upper extremity of said blow-iron is preferably of rectangular form in cross-section, or of any other suitable form for engagement with a rotating part, as disk 32. Said shaft 28 has an air-conduit 72 therein, whereby air is conducted to said blow-iron from a suitable air-conduit, as $5^a$, contained in or on said main shaft 5, by means below described. Said shaft 28 has a socket in its lower end, as shown, to receive a spiral spring 75 or other suitable cushion for the blow-iron-engaging disk 32, which is held loosely under said spring by the mouthpiece 31, which is screwed onto the lower end of said shaft. Any suitable means may be employed whereby said disk, while free to move up and down in said socket, is prevented from turning except when actuated by said shaft. When said blow-iron, therefore, is placed in the machine and supported by the spiders 16 and 17, as shown Fig. 1, such placing thereof takes place while arm 19 is in its upward position, whereby the shaft 28 and its attached devices are lifted above and out of contact with said ring 10. Therefore said blow-iron may be placed in said spiders, guided only by the enlargement 69 thereon engaging with the lower spider 17. Thus said blow-iron is at once placed in such position as places the glass thereon within the mold 52 and brings its upper end under the lower end of said shaft 28, to the end that the open lower end of the latter may move against the adjoining end of the blow-iron and cause the engagement of disk 32 therewith and air communication to be established between shaft 5 and the blow-iron.

The purpose of the above-described blow-iron actuating and engaging devices is to provide means for so simplifying the operation of placing a blow-iron having glass thereon in a hot plastic state unfailingly in proper position in the machine relative to the mold and the air-conducting devices that an unskilled person may easily manipulate the same. By means of said vibratory movement of the pivoted arms 19, carrying a shaft 28, the latter are lifted off successively from the blow-irons as soon as the formation of the glass article is effected, and the blow-iron and its attached article are then removed from the machine as usual. If when said shaft 28 drops for engaging said disk 32 with the end of the blow-iron the end of the latter is not at once received in the square perforation therein, the disk recedes into said socket, pushed by said blow-iron, but spring 75 holds the disk against the end of the latter, while the perforation therein is brought around to proper position to drop over the end of the blow-iron, when the latter is instantly caused to revolve in consonance with shaft 28, and until the article in the mold shall be fully formed, and then said shaft and disk are lifted from the blow-iron and its rotations cease.

The purpose of the above-described provision of means for the vertical adjustment of the said main shaft, the blow-iron-supporting devices, the blow-irons, and air-controlling devices simultaneously above and relative to the molds is to enable the operator of the machine to adjust all of the blow-irons at once while on the machine, so that the lower extremities thereof shall be all at equal distances above the tops of the molds, and for the further purpose of adjusting said lower extremities quickly and uniformly to such positions above said molds as the treatment of glass articles of varying lengths above the molds when blown therein shall demand, whereby the breakage of said articles in blowing the same is obviated and the product of the machine is increased.

The upper end of the shaft 28 is counterbored to received the piece 33, which is made to fit freely therein. Said piece 33 has an arm projecting at right angles therefrom, as shown, and an air-passage 73 is drilled from the end of said arm to a point at which it will intercept said air-passage 72, drilled at right angles thereto in the center of said piece 33. Said last-named piece is held against rotation by the flexible air-tube connection 34 and is of sufficient weight to resist the air-pressure exerted against its lower end. The above-described means for effecting an air-conduit connection between shaft 5 and the intermittently-rotating shaft 28 is the preferable one, but any other suitable one may be adopted. From said arm on piece 33 said flexible connection 34 is carried to a nipple 74, which is screwed into the air-passage 35, which is made through the hub 13 into the said central cavity thereinbefore mentioned, which cavity connects, as already set forth, with the said air-conduit $5^a$. Air therefore supplied under pressure to the said air-conduit passes therefrom to the cavity in said hub 13 and, if unimpeded, out through the passages 35, (of which there is one to each of the arms 19 of the machine,) and from thence through said flexible connections 34 to and through the air-passages within the piece 33 and shaft 28 to the blow-irons.

An essential feature of this invention is the air-controlling device whereby the supply of air to the blow-irons can be perfectly regulated as to time of applying said air-pressure to the plastic glass within the mold and the amount of the air-pressure so applied. It having been demonstrated by practice that such control is necessary to the production of a good article by the machine, the appliances herein described and shown are designed to closely imitate the blowing of glass as practiced by a workman skilled in the art in making such articles by hand and supplying air-pressure therefor from his lungs. Said appliances operate in such manner that the degree of the pressure of the air blown automatically into the interior of an article in process of formation is variable, or gradually and automatically increased from the commencement to the close, or otherwise varied, according to the requirements of the article to be produced.

The said means for regulating said air-supply consist of a valve 36 for each of said passages 35, so located within said hub 13 that the upper ends of the valve-stems stand in operative positions under the lower edge of a tubular cam 37, secured on the hub 11 of the ring 10. Between the heads on the outer ends of said valve-stems and the surface of the annular rib $13^a$ on the hub 13, through which said stems project, is a spiral spring 38, whereby the upper ends of said valve-stems are kept constantly in contact with said cam edge, which is made of such configuration on its depending edge, which is in contact with said valve-stems, that the required degree of air-pressure at any desired point during the revolution of the molds and their blow-irons connected to said blow-iron-receiving shaft 28 can be delivered to a mold arriving at that point at that time by the variable action of each of said valves 36 to cut off more or less of the air-supply provided for each blow-iron.

At the upper extremity of shaft 5 a loosely-fitting piece 59 is inserted into a counterbored recess at the end of the air-passage $5^a$ therein, and a flexible tube connection 40, fitting said piece, is carried to any convenient source of air-supply. As said shaft 5 revolves said piece is held stationary within its said recessed bearing by the flexible connection which is attached thereto, as aforesaid, in the same manner that said piece 33 is held by its tube connection 34, the air-pressure never being of sufficient strength to lift said piece 39 from its seat in the end of shaft 5. Fig. 7 illustrates said ring 10 in plan view. Said shafts 28 being engaged with the blow-irons, as above described, swing down and engage said ring and inclose the upper ends of the blow-irons about at the point 42 thereon, at which time the mold is closed upon the melted glass carried on said blow-iron, and said engagement and rotation of said iron and the glass thereon continue while said shafts move around about to the point 41 on said ring, and then the arms 19 swing upwardly, lifting said shafts off from said irons and leaving them free for removal with the attached blown article. The introduction and removal of said irons to and from the machine requires no lifting nor dropping movements thereof. During the time therefore that a blow-iron is moving between said points 41 and 42 on said ring 10 it can be removed from its connections on the arms of the spiders 16 and 17, and another blow-iron carrying a fresh gathering of glass can be inserted in the mold and in such position on said spider-arms that the mold, which is generally of the paste-lined variety, as it rises out of the cooling bath, as described in said Owens patent of October 22, 1895, as above referred to, will close around said gathering of molten glass on the end of said blow-iron, and the blowing is completed as aforesaid. At the time of the said complete closing of the mold upon the molten glass the stem of the valve 36, which governs the admission of air to the blow-iron, is in engagement with that part of cam 37 which operates said valve to admit the degree of air-pressure first required, and the succeeding action of the cam upon said valve is such as to then vary said pressure as required, such variation being ordinarily to gradually increase the same as the glass grows more rigid by cooling. Some articles demanding more and some less pressure at any point during the revolution of the mold around its circular path, said pressure may be diminished or increased or cut off altogether, according to the necessities of the case, by giving a proper shape to the edge of said cam 37, against which the end of said valve 36 bears. Thus by having a variety of cams 37, which can be applied to the machine, the work of the latter may be greatly varied and the product of said machine will be of perfect uniformity.

By the use of the above-described devices it is obvious that the supply of air through the blow-iron into the gathered glass within the mold is made automatically variable as to force or pressure and intermittent as to supply.

It frequently happens that of the many articles which can be manufactured on machines of this class there is great variation in the size of such articles, and it is therefore necessary to provide molds of various dimensions. Consequently the molds 52 are made removable from the mold-carriers 44, and the main central shaft 5, carrying the spiders 16 and 17, the arms 19, hung to the central hub 13, and the non-rotatable ring 10, are made adjustable vertically by means of the threaded sleeve 2 and hand-wheels 3 3, as described, whereby all of the operative elements of the machine above said molds can be adjusted as a whole without disturbing the relative interoperative positions of said elements.

From the above statement it is obvious that by the construction of the machine as herein set forth its adaptability to a great variety of uses is at once apparent, and by means of the absolute control of the air-pressure the quality of the work done by the machine is superior to that heretofore produced.

Referring to Figs. 2 and 3, views in plan and perspective are shown in Fig. 2 and in section in Fig. 3 of improved means for adjusting the two halves of the sectional molds 52, whereby the central dividing-line of said molds may be quickly brought into perfect alinement with the blowpipe, thereby saving much of the time heretofore required for adjusting said molds.

Figs. 9 and 10 show on a larger scale said improved construction, respectively, in perspective with the parts separated and in end elevation with the parts together. In said last-named figure and also in Fig. 3 the slide 43 has a movement between the upstanding grooved borders of said mold-carrier 44, hinged to the hub 15, said movement being imparted thereto in one direction by a cam 45, (see Figs. 2 and 3,) located under the said hub 15, and with the edge of which the roll 46 on the bolt 47 is held in contact by a spring 48, as shown in Fig. 3.

The operation of the mold-carrier is in its main features like that described in said Owens patent, that is to say, the said carriers and molds have a wheel 9 thereunder, which runs on a track on said base A, and in the latter is a depression having water therein, into which each mold is carried once in a revolution for the purpose of wetting the mold to cool it and prepare its paste-lined interior to again receive the molten glass from which to mold another article. The molds automatically open upon descending into said water and in like manner become closed upon leaving it. The said bolt 47 has fitting loosely thereon the hubs of two halved arms 49 and pivotally secured to said arms, as shown in Figs. 2 and 9, the arms 50, extending to the arms 51 on each half of the mold 52. A nut 53 on the said bolt 47 serves to hold said arms 49 in whatever position they may be placed relative to said bolt. Said arms 49 have a slot or bolt-hole 54 therein, through which passes the bolt 54$^a$, having a nut thereon, which is fixed in said slide 43. Said slots are preferably concentric with the bolt 47, and said bolt 54$^a$, in connection with said bolt 47, serves for steadying said arms 49.

In order to set the molds centrally with the mold-bottoms 55, the nut 53, and that on said bolt 54$^a$, is loosened, and then the mold-sections may be swung right or left to bring the mold parts to close perfectly around said bottom, and in so moving said mold-sections the arms 49 are moved about the bolt 47 as a center, and when said mold is in proper relation to the blow-irons, by setting up said nut 53 to a bearing and thereby securing said arms 49 in the position to which they were brought by the adjustment of the two halves of the mold about said bottom, the two halves of said mold will always close in the same relative position. In this manner all of the molds can be quickly adjusted to their respective blow-irons.

Fig. 3 shows in section means for finishing the bottom of certain articles by making the bottom of the mold of a separate piece and revoluble within the lower end of the mold and independently of the latter. The bottom of said mold 52 is supported in a cavity in the surface of the mold-carrier, as shown in Fig. 3, and centrally within said cavity a hole is made for the reception of a short shaft 76, to the upper end of which the bottom 55 of the mold is secured, and to the lower end of which is secured the beveled gear 56. Projecting downwardly from the bottom of the mold-carrier is a short arm 57, on which is pivoted the wheel 9, which supports said mold and mold-carrier in their circular path around on the top of the base A. Secured to said wheel 9, and revolving therewith, is a second beveled gear 60 in mesh with beveled gear 56. Hence as the wheel 9 is revolved by the movement of the mold-carrier, which is carried around by its connection with the shaft 5, motion is imparted to said bottom 55 of the mold. The surface of said bottom piece 55 is provided with radial grooves 61 on its upper surface, and holes 62 are bored therein to allow the water which may run off from the interior walls of said mold (after its immersion in water for cooling purposes) to drain off. The loose fit of said piece 55 in the cavity of the mold-carrier arm permits the water to find its way out after it has drained through the said bottom by holes 62 therein.

On the ends of the arms of the spiders 16 and 17 are provided latches for holding the blow-irons therein. On said spider 17 said latch (shown with the jaws open) consists of two jaws 63, having two rearwardly-extending arms thereon, said jaws being pivotally secured on the arm of the spider by a bolt 64. The said rearwardly-extending arms on said jaws 63 are offset, so that when the said jaws are crossed and bolted to the face of the arm of the spider the said two parts will lie in the same place. A bow-spring 65 engages the said two arms of jaws 63, and said jaws being crossed tends to keep them normally closed. A pin 66 is inserted into the face of the spider-arm in a line with the center of the guiding-slot 67 and the bolt 64 to the end that when said spring forces said jaws together the pin 66 will force them to close on a line with the center of the said guiding-slot 67. The open end of said slot has outwardly-curved sides, and the jaws 63 beyond the central circular point thereof are also outwardly curved, whereby easy entrance of the blow-iron therein is facilitated.

On the arms of spider 16 latches like that shown in Fig. 13 are employed. These latches are springs, and are so formed as to allow the blow-iron to reach its seat in the bottom of the slot in said arm, the curved arms of the spring bearing only on the side of the blow-iron next to the open end of said slot. These latches permit the easy insertion and removal of the blow-irons and yet hold them securely in their operative positions relative to the air-conduits above and the molds below the said spiders. Said blow-irons are made with an enlargement 69 about midway between the ends thereof, whereby each iron has an engagement with its supporting spider-arm, and is thereby held in proper position after being placed in the machine.

Spider 17 is the lower of the two spiders, and the construction of the latch and its arrangement when closed afford a suitable support for the enlargement 69 on said blow-iron, (see Fig. 1,) by which the latter is supported on said spider-arms.

Having thus described our invention, what we claim, and desire to secure by Letters Patent, is—

1. In an automatic machine for blowing glass, a main shaft containing an air-conduit, a mold, a blow-iron, means for supporting the blow-iron on said shaft in operative relation to the mold, air conducting and controlling devices supported on said shaft in operative relation to the blow-iron, and to said air-conduit, and means for adjusting said shaft, blow-iron support, blow-iron, and air conducting and controlling devices, simultaneously, to different vertical positions relative to the mold, substantially as set forth.

2. In an automatic machine for blowing glass, a main shaft containing an air-conduit, a mold, a blow-iron, means for supporting the blow-iron on said shaft in disconnection from said conduit, and in operative relation to said mold, and mechanism interposed between said conduit and said iron, and means intermittently to connect and disconnect said mechanism with the iron, forming an intermittent air-conduit connection between said iron and said conduit, and means for actuating said mechanism and for rotating said blow-iron, substantially as set forth.

3. In a machine for blowing glass, an air-conduit, a mold, a blow-iron supported in operative relation to the mold, and to said conduit, and means interposed between said conduit and blow-iron whereby the degree of pressure of air against the interior of an article in process of formation in said mold is variable, substantially as set forth.

4. In an automatic machine for blowing glass, a main shaft, an air-conduit in said shaft, a blow-iron, means for supporting the blow-iron on said shaft, an arm pivoted on said main shaft, a revoluble hollow shaft hung on said arm having an air-passage therethrough in communication with said conduit, and a socket for receiving the end of said blow-iron, a valve interposed between said conduit and said hollow shaft, means for operating said valve whereby the supply of air to the hollow shaft is controlled, means for swinging said arm whereby the hollow shaft is engaged with, and separated from, the end of the blow-iron, and means for rotating said hollow shaft, substantially as set forth.

5. In an automatic machine for blowing glass, a main shaft, an air-conduit in said shaft, a blow-iron, means for supporting the blow-iron on said shaft, an arm pivoted on said main shaft, a revoluble hollow shaft hung on said arm having an air-passage therethrough in communication with said conduit, and a socket for receiving the end of said blow-iron, a valve interposed between said conduit and said hollow shaft, means for operating said valve whereby the supply of air to the hollow shaft is controlled, means for swinging said arm whereby the hollow shaft is engaged with, and separated from, the end of the blow-iron comprising a cam 26, fixed around said main shaft, a lever 23, engaging said cam and connected to said pivoted arm, means for rotating said main shaft, and the friction-ring 10, with which a pulley on the hollow shaft engages and is thereby revolved, substantially as set forth.

6. In a glass-blowing machine, the posts B, of the machine having a hub between their upper converging ends, a screw-threaded sleeve adjustably supported in said hub, the main shaft passing through said sleeve and secured against endwise movement therein, the friction-ring 10, pivoted arms 19, and operating devices, for the arms, revoluble shafts 28, and disks thereon, and one or more blow-iron-holding spiders secured to said shaft, and the hand-wheels 3, having screw engagement with said sleeve, substantially as set forth.

7. In a glass-blowing machine, means for adjusting the sections of the molds thereof for coinciding action in closing, comprising the slide 43, provided with the bolt 47, and the bolt 54$^a$, combined with the arms 49, pivoted on said bolt 47, in said slide and each having a slot engaging said bolt 54$^a$, and connections uniting said arms and the mold-sections, substantially as set forth.

8. In a glass-blowing machine, the mold-supporting devices comprising the carrier 44, having the grooved borders, the slide 43, engaging said grooves having bolt 47, and bolt 54$^a$, thereon, the roll 46, on said slide, and the cam 45, which said roll engages, combined with the arms 49, pivoted on said bolt 47 and having slot engagement with said bolt 54$^a$, the sectional mold, and the connections 50, between said arms and the sections of said mold, substantially as set forth.

9. In an automatic machine for blowing glass, a mold, a mold-carrier, means for imparting a circular movement to said mold and carrier in a horizontal plane, a wheel 9, supporting said carrier and mold having a gear 60, on one face thereof, combined with a revoluble mold-bottom having a gear connection with said gear 60, whereby the said movement of the mold-carrier imparts a rotary motion to said mold-bottom beneath the same, substantially as described.

MICHAEL J. OWENS.
HENRY J. COLBURN.

Witnesses:
W. F. DONOVAN,
H. A. CHAPIN.